United States Patent [19]

Mehnert et al.

[11] Patent Number: 4,672,526

[45] Date of Patent: Jun. 9, 1987

[54] RECTIFYING CIRCUIT ARRANGEMENT FOR GENERATING AT LEAST ONE CONTROLLABLE DIRECT VOLTAGE FROM AT LEAST ONE ALTERNATING VOLTAGE

[75] Inventors: Walter Mehnert, Ottobrunn; Ludwig Barbacsy, Munich, both of Fed. Rep. of Germany

[73] Assignee: MITEC, Moderne Industrietechnik GmbH, Ottobrunn, Fed. Rep. of Germany

[21] Appl. No.: 755,137

[22] Filed: Jul. 15, 1985

[30] Foreign Application Priority Data

Jul. 27, 1984 [DE]  Fed. Rep. of Germany ....... 3427825

[51] Int. Cl.$^4$ .............................................. H02M 7/00
[52] U.S. Cl. ....................................... 363/69; 363/81; 363/87; 363/129
[58] Field of Search ........................ 363/67, 69, 78, 79, 363/81, 84, 87, 125, 129; 361/100

[56] References Cited

U.S. PATENT DOCUMENTS

| 4,245,295 | 1/1981 | Götz et al. | 363/87 |
| 4,547,843 | 10/1985 | Hucker | 363/67 |

Primary Examiner—Patrick R. Salce
Assistant Examiner—Anita M. Ault
Attorney, Agent, or Firm—Sughrue, Mion, Zinn, Macpeak and Seas

[57] ABSTRACT

In order to produce direct voltages with greater flexibility, a rectifier (1) according to the invention comprises an alternating voltage measuring sensor (25), a comparator (22), controllable switches (160 to 183) and a switch control (20), through which the switching states of the switches are alterable in dependence on the output signal of the comparator, in order so to connect at least one of the direct voltage outputs (11, 12, 13) for certain time spans during each alternating voltage phase one after the other with the alternating voltage inputs of the rectifier that a pulsating direct voltage drops at it relative to a fixed or variable direct voltage potential. The switching instants are determined through constant measurement of the instantaneous alternating voltage values and their comparison with predeterminable direct voltage levels or alternating voltages, which serves as reference values. The rectifier can additionally take over the function of a direct voltage regulator through measurement and monitoring of a direct output voltage and changing of the switching instants on the occurrence of deviations of this direct voltage from a predeterminable target value.

16 Claims, 9 Drawing Figures

RECTIFYING CIRCUIT ARRANGEMENT FOR GENERATING AT LEAST ONE CONTROLLABLE DIRECT VOLTAGE FROM AT LEAST ONE ALTERNATING VOLTAGE

FIELD OF THE INVENTION

The invention concerns a rectifier for the production of at least one direct voltage from an alternating voltage, particularly from the alternating voltages of a multiphase system.

BACKGROUND OF THE INVENTION

In known rectifiers of this kind, diodes are usually used, which are arranged in a bridge circuit and connect both the direct voltage outputs with the alternating voltage inputs. These diode circuits are self-controlling, i.e. they free a substantial current flow whenever a potential difference, which exceeds the forward voltage of the diode, is present in forward direction and block the flow of current when the voltage present at them falls below the forward voltage or assumes negative values. From an alternating voltage of given maximum amplitude, only a single direct voltage is always producible with rectifiers of that kind, the mean value of which voltage can indeed be different in dependence on the diode circuit employed and the size of the smoothing capacitors lying between the direct voltage outputs of the rectifier, is however unalterably fixed for a once chosen circuit arrangement.

An objective of the invention is to provide a rectifier which makes it possible without noteworthy losses to produce several direct voltages from one and the same alternating voltage, wherein these different direct voltages can be placed at disposal either simultaneously on several outputs or one after the other in time on the same outputs.

SUMMARY OF THE INVENTION

Thus, for the production of one or more direct voltages in a rectifier according to the invention, each of the concerned direct voltage outputs is connected alternately with the different alternating voltage inputs for certain time spans during each phase of the alternating voltage or alternating voltages with the aid of freely controllable switches, which preferably possess no valve characteristics, in such a manner that a desired, generally pulsating direct voltage drops across it with respect to another direct voltage output which can be connected either with a fixed potential, for example ground, or held, likewise through changing switch connections, at a predeterminable mean potential. In that case, the switch-over instants, i.e. the instants, at which a direct voltage output is separated from the alternating voltage input, with which it was connected until then, and is preferably instead thereof connected with another alternating voltage input, are determined thereby, that the instantaneous amplitude values of the voltages fed to the alternating voltage inputs are constantly measured and compared with predeterminable reference values. In the case of the latter, there can be concerned one or more fixed direct voltage levels or one or more alternating voltages which possess a temporal course other than that of the alternating voltage, with which they are compared. Whenever the comparator arrangement ascertains that a measured alternating voltage exceeds or falls below a relevant reference value, it delivers a corresponding signal to the switch control, which thereupon changes the switching state of one or more switches, i.e. opens one or more previously closed switches and/or closes one or more previously opened switches. At the same time, the switching state of other switches can remain unaltered, which are then actuated on other reference values being exceeded or fallen below. Which reference values are used and which switches are actuated at which reference values being exceeded or fallen below depends on which kind of alternating voltage system stands at disposal and which direct voltage or direct voltages shall be produced therefrom. For this, a certain program is predetermined for the switch control, from which program result unambiguous switching criteria which determine which switches must be opened and/or closed when, i.e. at which phase angles of the respective alternating voltage phase or phases.

Through the free selectability of the switching instants given hereby, one obtains an extraordinarily flexible rectifier which on the one hand with the principle of function remaining the same can find use in simple manner in single-phase as well as also any desired multiphase alternating voltage systems in order to produce the most diverse direct voltages and which on the other hand also permits, for a once fixed switch configuration, to derive quite different mean direct voltage values from one and the same alternating voltage system through alteration of the reference voltage values and-/or the switching instants.

A particular advantage of the rectifier according to the invention is furthermore to be seen in that it permits the use of switches, for example rapid semiconductor switches (power-MOS switches), which in the closed state display an extremely small forward resistance so that a maximum utilisation of the alternating voltage amplitudes standing at disposal is possible.

The high degree of variability and the optimum utilisation of the respective alternating voltages by a rectifier according to the invention come particularly well into significance when it is applied in conjunction with a multiphase system, particularly with a 3-phase rotary current system, the phases of which are each displaced through 120° relative to the other. In that case, for example, only two direct voltage outputs can be provided, of which the one is firmly connected with the neutral or star point conductor of the multiphase system, whilst the other is connectible through appropriate switches one after the other with a respective one of several or all phase conductors and, in a desired case, also still with the neutral conductor.

It is particularly advantageous when the switchable direct voltage output in such a case is always so alternately connected with the different conductors of the multiphase system that no voltage steps arise on the switching-over from one conductor to another. In order to attain this, one uses as reference voltages, with which the comparator compares the instantaneous amplitude values present on the individual conductors, just these instantaneous amplitude values in the manner that for example the voltages on the S-conductor and T-conductor and/or the neutral conductor serve as reference voltages for the voltage on the R-conductor, the voltages on the R-conductor, T-conductor and N-conductor for the voltage on the S-conductor and the voltages on the R-conductor, S-conductor and N-conductor for the voltage on the T-conductor. In that case, the N-conductor permanently has the same instantaneous amplitude value $U_N=0$. Coming into question as switching-over instants for a direct voltage output in this mode of operation of a rectifier according to the invention are always only the instants, in which the instantaneous voltage on the conductor, with which the direct voltage output was connected up to the switch-over, is according to amount and sign equal to the voltage on another of the conductors of the multiphase system; the concerned direct voltage output is then connected with just this other conductor simultaneously with the separation from the previous conductor.

Depending on which multiphase system a rectifier according to the invention is fed from, several suitable instants for a switching-over to another conductor occur for each alternating voltage period on a phase conductor.

Thus, in a 3-phase system, in which the individual alternating voltages are displaced one relative to the other through 120° each time, the voltage on each one phase conductor passes the zero potential in the direction of positive voltage values initially at the phase angle 0°. This "intersection" is suitable to separate a direct voltage output, which was previously connected with the neutral conductor, from this and to connect it with the phase conductor considered or to uncouple a direct voltage output, which was previously connected with this phase conductor, and to connect it with the neutral conductor. At a phase angle of 30°, the voltage on the considered phase conductor passes the 50% value of the positive crest voltage with positive slope, whilst the voltage on one of both the other phase conductors passes through the same value with negative slope. At this "intersection", too, a direct voltage output, which was until then connected with the one of both the phase conductors, can be switched over to the other phase conductor.

Corresponding "intersections" furthermore occur when the voltage on the considered phase conductor passes through the phase angle 150° (50% value of the positive crest voltage with negative slope), 180° (zero transition with negative slope), 210° (50% value of the negative crest voltage with negative slope) and 330° (50% value of the negative crest voltage with positive slope).

Still more intersections of that kind result in a 6-phase system, namely in addition to the just named intersections at the phase angles 60° (86.6% value of the positive crest voltage with positive slope), 120° (86.6% value of the positive crest voltage with negative slope), 240° (86.6% value of the negative crest voltage with negative slope) and 300° (86.6% value of the negative crest voltage with positive slope).

According to the invention, it is not necessary to undertake a switching-over at each of these intersections. Rather, in dependence on which direct voltage shall be produced on a direct voltage output, quite certain intersections are selected, on the attainment of which the direct voltage output concerned is separated from the previous conductor of the multiphase system and connected with another.

A high flexibility results for a rectifier according to the invention thereby, that a once made selection of such intersections, at which switching-over is done, is not finally fixed for a given switch arrangement, but can be altered if desired or even varied several times, for example within the scope of a continuous program. In that case, all the switches present need not always be used in the concrete case. Rather, for the production of a certain direct voltage, individual switches, which must be closed for certain time spans for the production of another direct voltage, can remain permanently open.

Should however only a single direct voltage be produced permanently by a rectifier according to the invention, then also only the switches are provided, which are absolutely necessary for this.

In a particularly preferred example of embodiment of a rectifier according to the invention, at least one direct voltage output is provided, which is constantly connected with the phase conductors of the multiphase system in the manner that just the alternating voltage always appears on it, which passes through its—for example positive—maximum. For a 3-phase system, this means that this direct voltage output is connectible one after the other with each of the three phase conductors and that it is always connected with that phase conductor, the alternating voltage of which passes through its phase angle range between 30° and 150°. Whenever the voltage on a phase conductor, with which the direct voltage output is just connected, attains the phase angle 150°, at which this voltage passes through the 50% value of the positive crest voltage with falling slope, the voltage on one of both the other phase conductors passes through the same value with positive slope and its phase angle of 30°. The direct voltage output is connected with just this phase conductor, whilst it is at the same time separated from the "old" phase conductor. When the voltage on the "new" phase conductor attains its phase angle of 150°, then the direct voltage output is separated again also from this phase conductor and instead thereof connected with the third phase conductor, on which the voltage has now attained the phase angle of 30°. If the voltage on this third phase conductor then passes through the phase angle of 150°, the voltage on the first names conductor has in the mean time again attained its 30° phase angle so that the considered direct voltage output can now again be switched to the first phase conductor. The direct voltage output is thus without interruption constantly connected with one of the three phase conductors and the pulsating direct voltage, which can be taken off at it relative to the zero potential, pendulates to and fro between the positive 50% value and the positive 100% value of the crest voltage at three times the frequency of the alternating voltage.

Additionally to the just described first direct voltage output, a second direct output voltage can be provided in a rectifier according to the invention, which is fed from a three-system, which second output is constantly so connected in sequence with the three phase conductors that just the alternating voltage always appears on it, which passes through its negative maxima, i.e. the phase angle region of 210° to 330°. Thereby, analogously to the first direct voltage output, one obtains on this second direct voltage output a direct voltage which is pulsating negatively relative to the zero potential and pendulating between the negative 50% value and the negative 100% value of the crest voltage at three times the frequency of the alternating voltage.

The pulsating difference direct voltage, which can be taken off between both the just described direct voltage outputs, displays particularly favourable properties. Since the ripples of both the pulsating direct voltages display a phase displacement of 60° (referred to the frequency of the alternating input voltage), the absolute amount of one of both the direct voltages always passes through its maximum just when the absolute amount of the other direct voltage passes through its minimum. Thereby, the ripples of both the direct voltages partially compensate mutually and the difference voltage, which pendulates to and fro between 1.5 times and 1.732 times the crest voltage of the alternating input voltage, has a very low ripple.

In a 6-phase system, direct voltage outputs can likewise be provided, which correspond to the above first and/or second direct voltage outputs and the connections of which with three of the 6 phase conductors are switched over in exactly the same manner. The pulsating direct voltages arising in that case can likewise be taken off individually relative to the zero potential or the difference voltage of both these direct voltage outputs can find further use also here.

Instead thereof, one or two direct voltage outputs can however also be provided, in which the switching-over so takes place that they are always connected with the phase conductors, on which the voltage just passes through the phase angle region from 60° to 120° or from 240° to 300°. In order to make this possible, a connection between each of the concerned direct voltage outputs and a respective one of all six phase conductors must be producible. From this results the advantage of a still smaller ripple and a higher mean value of the direct voltage or direct voltages that can be taken off.

According to the invention, in the case of a rectifier fed from a 6-phase system, also more than two of the above described direct voltage outputs in any desired combinations and/or further direct voltage outputs can be provided, which are additionally still connectable with the zero potential and thus permit the production of further direct voltage mean values. Beyond this, different direct voltages can be produced one after the other also here at one and the same direct voltage outputs thereby, that other switching-over instants are chosen.

Advantageously, a rectifier according to the invention can additionally still take over the function of a direct voltage regulator thereby, that it further comprises a measuring sensor for the determination of a direct voltage to be kept constant between at least two of its direct voltage outputs, a comparator for the comparison of the direct voltage measurement value with a predeterminable target value as well as a regulating unit, through which the switching criteria are alterable, by reason of which the switch control actuates the switches. This can take place either in the manner that other reference values are given to the alternating voltage comparator on the occurrence of deviations of the direct voltage from the target value so that it delivers its output signals at other instants to the switch control which thus also actuates the switches at other instants than hitherto. Another possibility consists in feeding all reference values possibly coming into question to the alternating voltage comparator and to let the switch control select those from the plurality of output signals of the comparator, which define the "favourable" switching instants, i.e. switching instants for the actuation of certain switches in the manner that the desired direct voltage appears at the associated direct voltage outputs. If this direct voltage threatens to change, then other "favourable" switching instants are selected automatically in order to attain at least a partial compensation of this change. Both the just described regulating methods can according to the invention also be combined one with the other.

BRIEF DESCRIPTION OF THE DRAWING

The invention is described in the following with the aid of examples of embodiment with reference to the drawing; in this, there show.

DESCRIPTION OF PREFERRED EMBODIMENTS OF THE INVENTION

Figure 1:
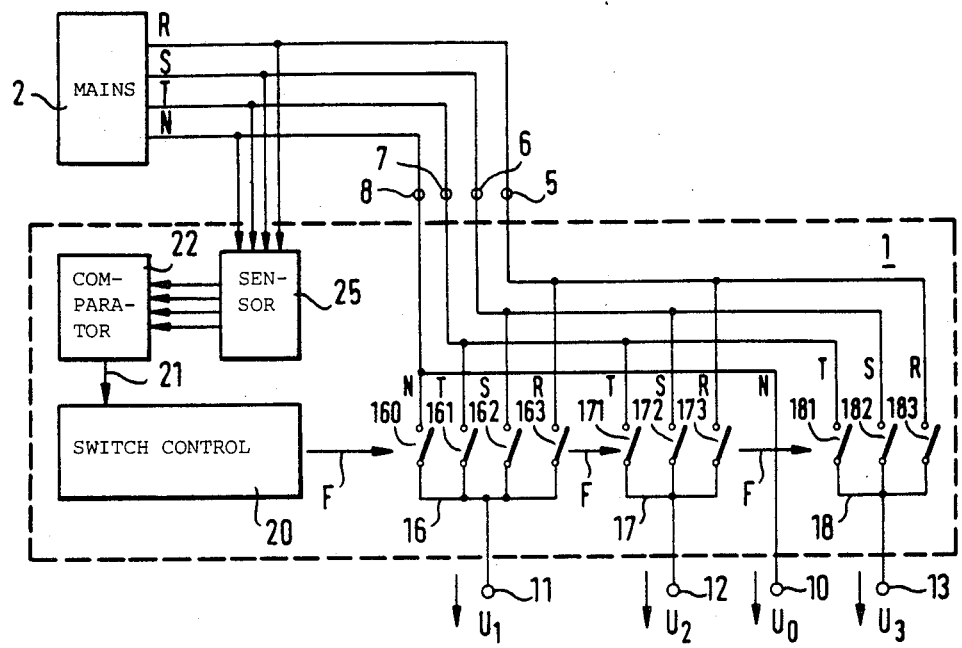
FIG. 1 a rectifier according to the invention with several direct voltage outputs and fed from a 3-phase alternating voltage system, FIGS. 2a to 2c the voltage course on the three phase conductors of FIG. 1 as well as the different pulsating direct voltages which are producible through the selection of certain switch-over instants at some of the direct voltage outputs of the rectifier of FIG. 1, FIGS. 3a to 3c again the voltage course on the three phase conductors of FIG. 1 as well as the pulsating direct voltages producible at a further direct voltage output through the choice of other switch-over instants, FIG. 4 the voltage course on the phase conductors of a 6-phase alternating voltage system with possible further switching-over instants and FIG. 5 a rectifier according to the invention and expanded into a direct voltage regulator.

Illustrated in FIG. 1 is a rectifier 1 according to the invention, with the aid of which a series of pulsating direct voltages $U_1$, $U_2$ and $U_3$ can be produced from the alternating voltages of a 3-phase rotary current system, which can be conducted to the alternating voltage inputs 5, 6 and 7 of the rectifier 1 by way of the three phase conductors R, S and T from a rotary current generator or a mains 2. A further input 8 of the rectifier 1 is connected with the neutral conductor N of the multiphase system.

The rectifier 1 possesses three direct voltage outputs 11, 12 and 13, at which the above named pulsating direct voltages $U_1$ to $U_3$ can be taken off. The potential $U_0$ of the neutral conductor N stands at disposal at a further output 10.

Each of the direct voltage outputs 11, 12 and 13 is connected with an associated switch group 16, 17 and 18, respectively, wherein the switch group 16 comprises four switches 160, 161, 162 and 163, the switch group 17 comprises three switches 171, 172 and 173 and the switch group 18 comprises three switches 181, 182 and 183.

With the aid of three switches in each switch group 16, 17 and 18, the associated direct voltage output 11, 12 and 13 can be connected selectably one after the other with a respective one of the three phase conductors R, S and T. Beyond that, the direct voltage output 11 can also still be connected with the neutral conductor N of the multiphase system with the aid of the additionally present switch 160.

It is expressly pointed out that only one switch is always closed in each switch group 16, 17 and 18 at a given instant, whilst all remaining switches of the switch group concerned are opened so that a short-circuit of the mains 2 or of the rotary current generator is avoided.

The control of the switches 160 to 183 takes place with the aid of a switch control 20, which is indicated symbolically by the arrows F in FIG. 1. In that case, each of the switches 160 to 183 can be driven individually, i.e. independently of the remaining switches. In departure from the simplified illustration of the FIG. 1, each of the switches 160 to 183 is thus in fact connected through an individual drive line with the switch control 20.

The switch control 20 receives its information data about an instant having been attained, in which it has to alter the switching state of one or more of the switches 160 to 183, i.e. has to transfer this switch or these switches out of the opened into the closed or out of the closed into the opened state, by way of a line 21 from a comparator 22, to which in the present case are fed the output signals of a measuring sensor arrangement 25, which in its turn measures the instantaneous amplitude values of the voltages which also appear on the three phase conductors R, S and T relative to the neutral conductor N. Since just these voltage values in the present case also serve as reference voltage values, which the comparator 22 compares with the alternating voltage values, it is not required to conduct additional reference voltage values from outside to the comparator 22.

The mode of operation of the rectifier 1 illustrated in FIG. 1 is described in the following with reference to the FIGS. 2a to 2c and 3a to 3c.

Figure 2A:
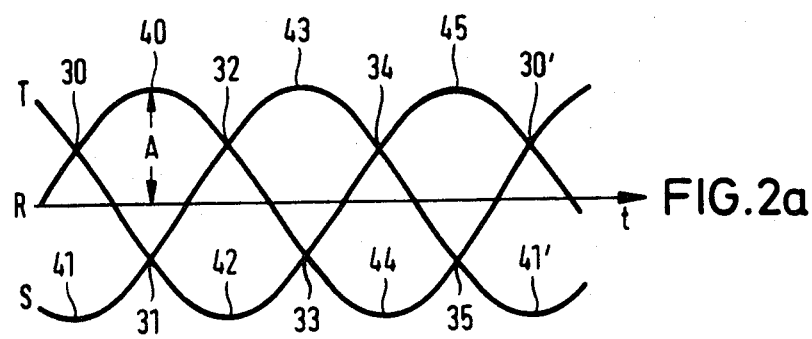
Figure 2B:
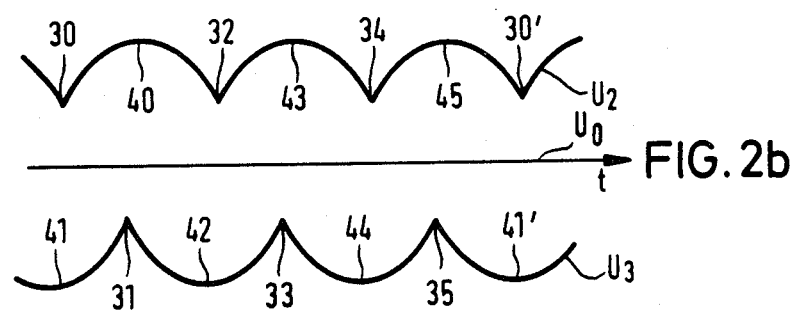

The voltage courses on the three phase conductors R, S and T of the multiphase system illustrated in FIG. 1 are reproduced on a time scale in FIG. 2a. It is in that case assumed that the voltage on the phase conductor R at the extreme left passes through the zero potential in positive direction and all phase angle statements in the following are related to this zero transition. It is furthermore assumed that at the instant, at which this zero transition takes place, the direct voltage output 12 of the rectifier 1 of FIG. 1 is connected with the T-phase conductor thereby, that the switch 171 is closed, whilst the switches 172 and 173 are opened, and that the direct voltage output 13 is connected with the phase conductor S thereby, that the switch 182 is closed, while the switches 181 and 183 are opened.

The pulsating direct voltage appearing at the direct voltage output 12 with respect to the direct voltage output 10 has thus just passed one of its maxima and moves towards the 50% value of the positive crest voltage A, whilst the pulsating direct voltage, which drops between the direct voltage output 13 and the direct voltage output 10, runs towards its negative maximum 41, which is equal to the negative crest value A. This is illustrated in the FIG. 2b, which in its upper halves reproduces the temporal course of the pulsating direct voltage $U_2$ appearing between the direct voltage outputs 10 and 12 and in its lower half the pulsating voltage $U_3$ appearing between the direct voltage outputs 10 and 13, which direct voltages are positive and negative, respectively, relative to the zero potential $U_0$ illustrated in the centre.

When the alternating voltage appearing on the phase conductor R has attained the phase angle of 30°, it passes with positive slope through the 50% value of the crest voltage A, which the voltage appearing on the phase conductor T at the same time passes through with negative slope. Thus, in the voltage diagram illustrated in FIG. 2a, a first intersection 30 results, which is recognised by the comparator 22 by reason of the voltage measurement values fed to it from the measuring sensor 25 and translated into a corresponding information signal which gets by way of the line 21 to the switch control 20, which thereupon opens the switch 171 and at the same time closes the switch 173 so that the direct voltage output 12 is now connected with the phase conductor R and the pulsating direct voltage $U_2$ appearing at it tends towards the next maximum 40 illustrated in FIG. 2b. At the time of the switch-over instant 30, the voltage appearing on the phase conductor S has attained its negative maximum 41, which appears at the direct voltage output 13 and is likewise characterised by the reference symbol 41 in FIG. 2b for the voltage $U_3$ tappable there.

When the direct voltage $U_2$ with respect to $U_0$ at the direct voltage output 12 passes through the positive maximum 40 at a phase angle of 90°, the alternating voltages on the phase conductor T and S in the intersection 31 pass through the 50% value of the negative crest voltage $-A$. In this instant and by reason of a corresponding comparator signal, the switch 182 is opened and the switch 181 closed at the same time by the switch control 20 so that the direct voltage output 13 is connected with the phase conductor T for a following time span, during which the voltage appearing on the phase conductor T passes through its negative maximum 42. Co-inciding in time with this negative maximum 42 is the intersection 32, in which the switch control 20 opens the switch 173 and closes the switch 172 so that the direct voltage output 12 is connected with this phase conductor S for the following time span, in which the voltage appearing on the phase conductor S passes through its positive maximum 43.

Co-inciding in time with the positive maximum 43 is the intersection 33, in which the voltages on the phase conductors R and T passes through the 50% value of the negative crest voltage $-A$ and in which the switch control 20 opens the switch 181 and at the same time closes the switch 183 so that the direct voltage output 13 is separated from the phase conductor T and instead thereof connected with the phase conductor R, on which the voltage passes through the negative maximum 44 in the following time span. The switch-over instant 34 for the direct voltage output 12 co-incides with this maximum 44, in which instant the direct voltage output 12 is separated from the previous or "old" phase conductor S and instead thereof connected with the "new" phase conductor T, on which the voltage subsequently passes through the positive maximum 45, which co-incides in time with the intersection 35 for the negative direct voltage $U_3$, in which the direct voltage output 13 is separated from the phase conductor R and instead thereof connected with the phase conductor S, on which the voltage subsequently passes through a new maximum 41' which corresponds to the maximum 41 illustrated at the extreme left in FIG. 2a.

In corresponding manner, the voltages on the phase conductors T and R pass through the intersection 30' so that the just described course now repeats periodically.

Figure 2C:
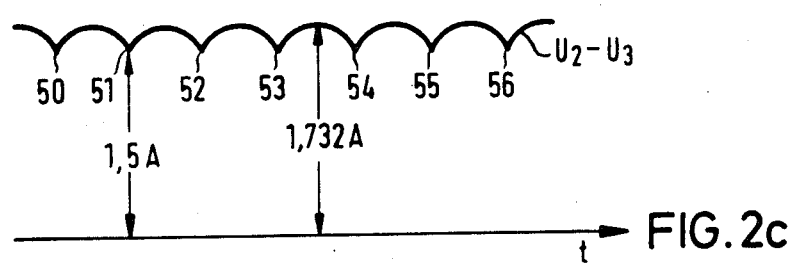

The temporal course of the difference voltage $U_2 - U_3$, which can be taken off between both the direct voltage outputs 12 and 13, is illustrated in FIG. 2c. One sees that this voltage fluctuates between 1.5 A and 1.732 A at three times the frequency of the alternating input voltage and in that case displays a substantially smaller ripple than the pulsating direct voltages $U_2$ and $U_3$. The difference voltage assumes its minimum values 50, 51, 52 and so forth whenever $U_2$ or $U_3$ passes through one of the maximum values 40, 41, 42 and so forth or the respective other voltage passes through one of the minimum or intersection values 30, 31 and 32.

Figure 3A:
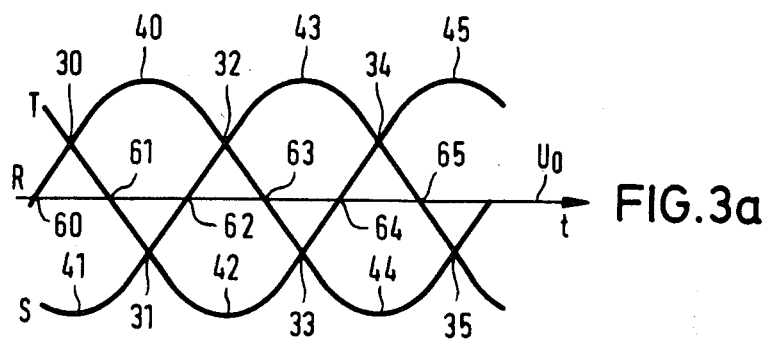

The voltage course on the three phase conductors R, S and T of the multiphase system illustrated in FIG. 1 is reproduced once again in FIG. 3a, wherein still the intersections 60 and 65, in which the voltages on the different phase conductors each time pass through the zero potential, still come in addition to the intersections 30, 31, 32 and so forth and the maximum values 40, 41, 42 and so forth already described in conjunction with FIG. 2a. Illustrated in the upper region in FIG. 3b is again the pulsating direct voltage $U_2$ with respect to $U_0$, which in the above described operation of the switch group 17 can be taken off between the direct voltage outputs 10 and 12. In the lower region of the FIG. 3b, a pulsating negative direct voltage $U_1$ is illustrated in continuous lines and a pulsating direct voltage $U_1'$, which is negative with respect to the voltage $U_2$, is illustrated in dashed lines, each of these direct voltages being referred to $U_0$ and tappable according to mode of operation of the switch group 16 between the direct voltage outputs 10 and 11 of the rectifier illustrated in FIG. 1.

Figure 3B:
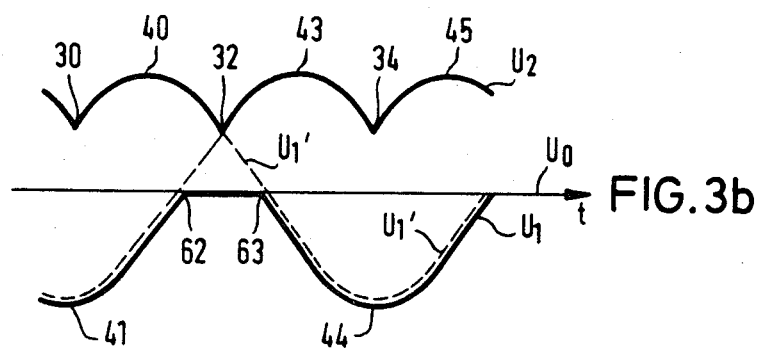
Figure 3C:
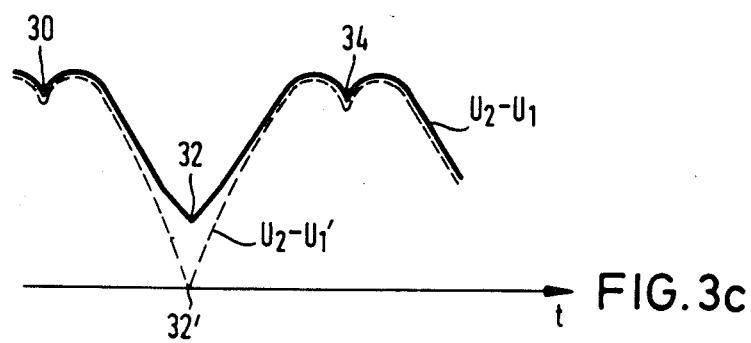

As is evident from the FIGS. 3a to 3c, for the production of the voltage $U_1$, the direct voltage output 11 is initially connected by way of the closed switch 162 with the phase conductor S until the voltage appearing on this phase conductor passes through the zero potential in the intersection 62. In this instant and by reason of a corresponding comparator signal, the switch 162 is opened by the switch control 20 and at the same time instead thereof the switch 160 is closed, through which the direct voltage output 11 is connected with the neutral conductor of the 3-phase system. For the following time span, i.e. up to the intersection 63, in which the voltage appearing on the phase conductor R passes through the zero potential, the direct voltage output 11 remains connected with the neutral conductor in this mode of operation in order then to be separated from this through opening of the switch 160 and instead thereof, through closing of the switch 163, to be connected with the phase conductor R, on which the voltage in the following time span passes through a negative half wave with the negative crest 44.

In a somewhat different mode of operation of the switch group 16, the switch 162, which initially connects the direct voltage output 11 with the phase conductor S, can remain closed during passage of the intersection 62, while the switch 160 remains opened. Instead thereof, the switch 162 is opened only when the voltage appearing on the phase conductor S has reached the intersection 32. The switch 163 is then closed simultaneously in this intersection so that the direct voltage output 11 is now connected with the phase conductor R and the voltage appearing at it tends towards the negative crest value 44. Thereby, the voltage course $U_1'$, drawn in dashed lines in FIG. 3b, results.

Illustrated in FIG. 3c are both the difference voltages $U_2-U_1$ and $U_2-U_1'$, which let themselves be taken off between the direct voltage outputs 12 and 11 in both the just described modes of operation. One sees that in both cases, there are concerned more or less strongly pulsating direct voltages which pendulate to and fro between 0.5 times and 1.732 times the crest voltage or between the zero potential and 1.732 times the crest voltage and lead to different direct voltage mean values which beyond that differ from the direct voltage mean values which can be taken off between the direct voltage outputs 10 and 12 or 10 and 13 or 12 and 13.

In the kinds of the production, which are described in conjunction with the FIGS. 2a to 2c and 3a to 3c, of direct voltages from a 3-phase rotary current system with the aid of a rectifier according to the invention, only some possibilities are concerned, since a plurality of further voltage courses at and between the outputs 10, 11, 12 and 13 and possible further direct voltage outputs lets itself be attained through another choice and combination of intersections.

Figure 4:
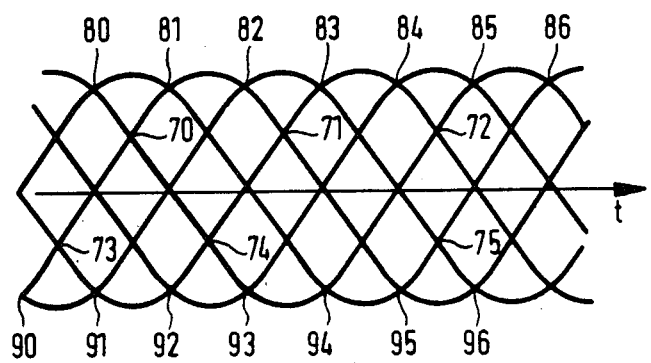

The temporal voltage course on the six phase conductors of a corresponding multiphase system is illustrated in FIG. 4, wherein the phase displacement between the individual phase conductors here amounts to 60° each time. As for a 3-phase system, the 50% value intersections, of which only some are designated with the reference symbols 70 to 75, appear here in the positive as well as in the negative half wave region. According to the invention, these intersections 70 to 75 just as the zero potential transition can be used as switch-over instants for a rectifier according to the invention in order to produce a plurality of different direct voltage mean values and one or more direct voltage outputs. In addition to the intersections described in connection with a 3-phase system, standing at disposal here are however also still the intersections 80 to 86 and 90 to 96, in which the voltages each time on two of the six phase conductors simultaneously pass through the 86.6% value of the positive or negative crest voltage. These intersections can be used in the already described manner in order so to switch one or two direct voltage outputs from phase conductor to phase conductor that it or they is or are constantly connected with that phase conductor, on which the voltage passes through the positive or negative crest value shortly after the switching-over. Both the thus obtained direct voltages distinguish themselves by a low ripple which however does not let itself be reduced further through formation of the difference voltage, since no displacement occurs here between the maximum and minimum values of the absolute amounts. However, a particularly large mean value results fhere for both the individual voltages as well as also for their difference voltage, since the minimum value of the difference voltage is equal to 1.732 times the crest voltage A and the maximum value of the difference voltage is equal to twice the crest voltage A.

Figure 5:
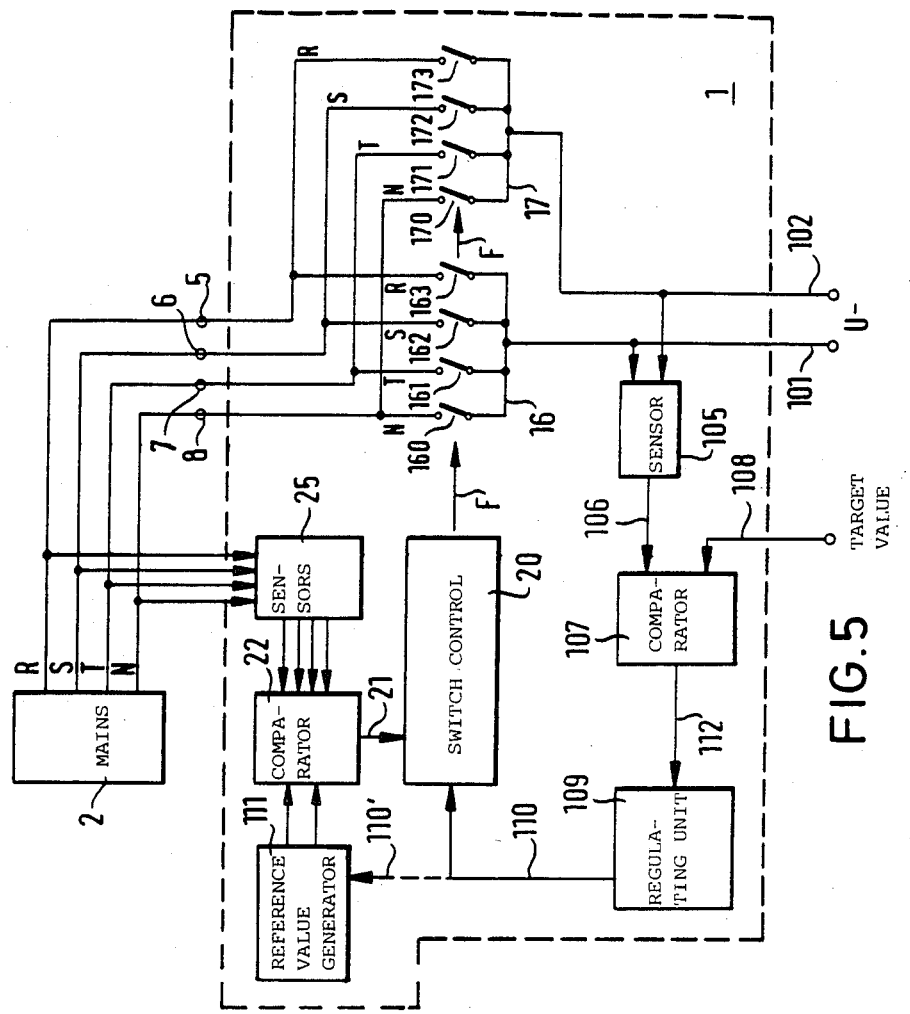

In FIG. 5, a rectifier 1 according to the invention comprises, in addition to the components which are already illustrated in FIG. 1 and here again carry the same reference symbols, a direct voltage measuring sensor 105, which constantly measures the direct voltage tappable between both the direct voltage outputs 101 and 102 and feeds the measurement value through a line 106 to a comparator 107, which compares these measurement values with a predeterminable target value, which it receives by way of a second input line 108.

Both the direct voltage outputs 101 and 102 are connectible also here by way of switch groups 16 and 17 in sequence with a respective one of the three phase conductors R, S and T and with the neutral conductor N of the 3-phase system. For this purpose, the switch group 17 is compared with FIG. 1 enlarged by a switch 170, through which a connection is producible between the output 102 and the neutral conductor N.

If a deviation of the monitored direct voltage from the target value occurs, then the comparator 107 gives a corresponding signal by way of a line 112 to a regulating unit 109, which either by way of a line 110 causes the switch control 20 to select signals other than the previously used ones from the signals delivered by the comparator 22 by way of the line 21 and thereby so to change the switching instants for the switch groups 16 and 17 that the direct voltage between the outputs 101 and 102 remains as constant as possible. Alternatively or complementarily hereto, a reference value generator 111 can be caused by the regulating unit 109 by way of the line 110′, drawn in dashed lines, to give other reference values than previously to the alternating voltage comparator 22 so that it hereby comes to an alteration of the switching instants for the switch groups 16 and 17 and thus to a compensation of the direct voltage change that has arisen.

What is claimed is:

1. A rectifying circuit arrangement for generating at least one controllable direct voltage appearing between two direct voltage output terminals of said circuit arrangement from at least one alternating voltage having a continuously and periodically changing instantaneous amplitude value and being applied to corresponding alternating voltage input terminals of said circuit arrangement, said circuit arrangement comprising:
  a measuring sensor arrangement determining said instantaneous amplitude value of said at least one alternating voltage,
  a comparator comparing said instantaneous amplitude value with at least one reference voltage and generating respective output signals when said instantaneous amplitude value is equal to said at least one reference voltage,
  controllable switches which can be closed and opened by applying to them closing and opening control signals, respectively, and by means of which at least one of said direct voltage output terminals is selectably connectable with and disconnectable from said alternating voltage input terminals, and
  a switch control means generating said closing and opening control signals for said controllable switches in dependence on said output signals of said comparator.

2. A circuit arrangement according to claim 1 and generating said at least one controllable direct voltage from phase voltages of a multiphase system having an individual phase conductor for each of said phase voltages, each of said phase conductors being connected to a corresponding one of said alternating voltage input terminals of said circuit arrangement, wherein by means of said controllable switches at least one of said direct voltage output terminals is successively connectable to and disconnectable from at least several ones of said alternating voltage input terminals in such a manner that it is always connected to only one of said input terminals at a time.

3. A circuit arrangement according to claim 2, wherein said phase voltages on said conductors are used as reference voltages applied to said comparator, and wherein said controllable switches are so controlled that a previously closed switch connecting said at least one direct voltage output terminal to one of said alternating voltage input terminals is opened when the instantaneous amplitude value of the phase voltage on the conductor connected to this alternating voltage input terminal is according to sign and amount equal to the instantaneous amplitude value of the phase voltage on a predetermined other conductor of the multiphase system, and that simultaneously with the opening of said previously closed switch a previously opened switch is closed in order to connect said at least one direct voltage output terminal to the one of said alternating voltage input terminals which is connected to said predetermined other conductor.

4. A circuit arrangement according to claim 3, wherein two direct voltage output terminals are switchable further, in the case of voltage equality, from alternating voltage input terminal to alternating voltage input terminal, each being connected to one of said conductors of said multiphase system, in such a manner that one of said two direct voltage output terminals is always connected to the alternating voltage input terminals the conductors connected thereto are passing through the positive voltage region, and that the other one of said two direct voltage output terminals is always connected to the alternating voltage input terminals the conductors connected thereto are passing through the negative voltage region.

5. A circuit arrangement according to claim 2 or 3, wherein the multiphase system further comprises a neutral conductor being connected to a respective one of said alternating voltage input terminals of said circuit arrangement, and wherein at least one of said direct voltage output terminals is selectably connectable to said alternating voltage input terminal being connected to said neutral conductor by means of at least one of said controllable switches.

6. A circuit arrangement according to claim 3, which further comprises a measuring sensor for obtaining measurement values of a direct voltage tappable between at least two of said direct voltage output terminals, a comparator comparing said measurement values of said direct voltage with a target value, and a regulating unit by means of which switching criteria for said switch control means are so alterable that said direct voltage deviates as little as possible from the target value.

7. A circuit arrangement according to claim 6, wherein said switching criteria are alterable thereby, that at least one altered reference voltage is feedable to said comparator comparing said instantaneous amplitude value of said at least one alternating voltage with said at least one reference voltage.

8. A circuit arrangement according to claim 6 or 7, wherein several reference voltages are constantly fed to said comparator comparing said instantaneous amplitude value of said at least one alternating voltage with at least one of these reference voltages, and wherein said switching criteria are alterable thereby, that the switching-over of certain ones of said controllable switches takes place when said instantaneous amplitude value exceeds or falls below different ones of said reference voltages.

9. A circuit arrangement according to claim 2, wherein said multiphase system comprises three phase conductors being connected to three alternating voltage input terminals, and wherein said at least one of said direct voltage output terminals is selectably connectable successively with a respective one of said three alternating voltage input terminals.

10. A circuit arrangement according to claim 9, wherein a positive and a negative direct voltage output terminal are switchable further from alternating voltage input terminal to alternating voltage input terminal, wherein the switching-over of said positive direct voltage output terminal from one alternating voltage input terminal to another alternating voltage input terminal always takes place when the instantaneous amplitude value of the voltage on both the phase conductors being connected to these two alternating voltage input terminals passes through the positive 50% value of the maximum amplitude of the alternating voltage, and wherein the switching-over of said negative direct voltage output terminal from one alternating voltage input terminal to another alternating voltage input terminal always takes place when the instantaneous amplitude value of the voltage on both the phase conductors being connected to these two alternating voltage input terminals passes through the negative 50% value of the maximum amplitude of the alternating voltage.

11. A circuit arrangement according to claim 9, wherein the at least one direct voltage output terminal is also selectably connectable with said alternating voltage input terminal to which said neutral conductor is connected.

12. A circuit arrangement according to claim 2 or 9, wherein at least two direct voltage output terminals are present, between which several direct voltages, each differing from the other, are tappable successively.

13. A circuit arrangement according to claim 2 or 9, wherein more than two direct voltage output terminals are present, between which several direct voltages, each differing from the other, are tappable simultaneously.

14. A circuit arrangement according to claim 9, which further comprises a measuring sensor for obtaining measurement values of a direct voltage tappable between at least two of said direct voltage output terminals, a comparator comparing said measurement values of said direct voltage with a target value, and a regulating unit by means of which switching criteria for said switch control means are so alterable that said direct voltage deviates as little as possible from the target value.

15. A circuit arrangement according to claim 14, wherein said switching criteria are alterable thereby, that at least one altered reference voltage is feedable to said comparator comparing said instantaneous amplitude value of said at least one alternating voltage with said at least one reference voltage.

16. A circuit arrangement according to claim 14 or 15, wherein several reference voltages are constantly fed to said comparator comparing said instantaneous amplitude value of said at least one alternating voltage with at least one of these reference voltages, and wherein said switching criteria are alterable thereby, said the switching-over of certain ones of said controllable switches takes place when said instantaneous amplitude value exceeds or falls below different ones of said reference voltages.

* * * * *